Oct. 20, 1936. J. R. PATTEE 2,057,845

ELECTRICAL MEASURING INSTRUMENT

Filed July 13, 1935 2 Sheets-Sheet 1

INVENTOR
JOHN R. PATTEE
BY
Riddle, Bethell & Montgomery
ATTORNEYS

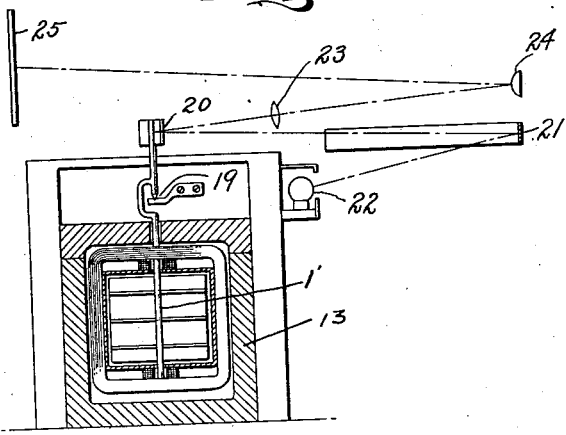
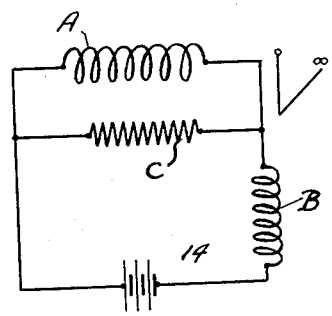
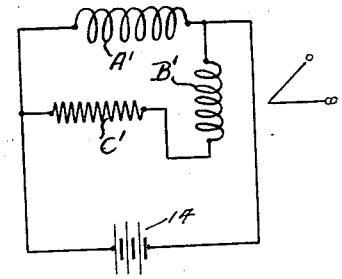
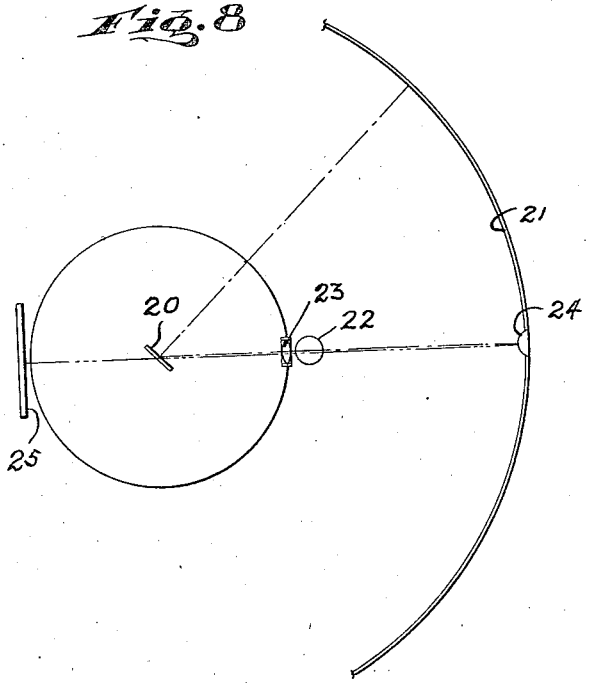
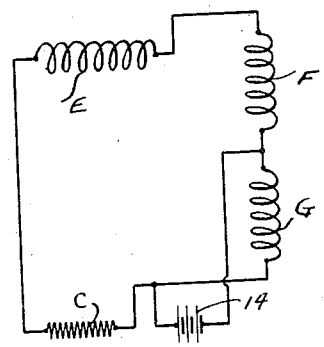

Patented Oct. 20, 1936

2,057,845

UNITED STATES PATENT OFFICE 2,057,845

ELECTRICAL MEASURING INSTRUMENT

John R. Pattee, Long Island City, N. Y.

Application July 13, 1935, Serial No. 31,198

19 Claims. (Cl. 171—95)

My invention relates to improvements in electrical measuring instruments and more specifically instruments for indicating current ratios, one of the objects of my invention being the provision of an instrument wherein the readings are determined by the ratio of two currents, and wherein a permanent horseshoe magnet such as usually employed is dispensed with.

Another object of my invention is the provision of an instrument of the character indicated which can be manufactured as readily as a voltmeter or ammeter of the same quality. A further object of my invention is the provision of an electrical measuring instrument in which the scale is logarithmic, between points one tenth the value of the mid-point of the scale and ten times the value of the mid-point, whereby readings can be taken with accuracy within a range of 100 to 1. The scale ranges from zero to infinity so that the pointer will never go off scale. There being no field magnet to lose magnetization, my scale calibrations are permanent.

The range of my improved electrical measuring instrument may be changed by merely inserting resistances in suitable places in the circuit without necessitating the changing of the operating voltage.

A still further object of my invention resides in the use of a core having good permeability and very low hysteresis and retentivity. It is not permanently magnetized.

A still further object of my invention resides in the provision of an optical system in connection with the scale whereby the same can be read within much closer limits than a simple scale.

Further objects of my invention will be manifest from the following description and the accompanying drawings, in which drawings:

Fig. 7 illustrates the application of the optical system adapted to be used in connection with the taking of readings from my improved system;

Fig. 8 is a plan view of this system; and

Figs. 9, 10, and 11 are modified wiring diagrams.

Figure 1:
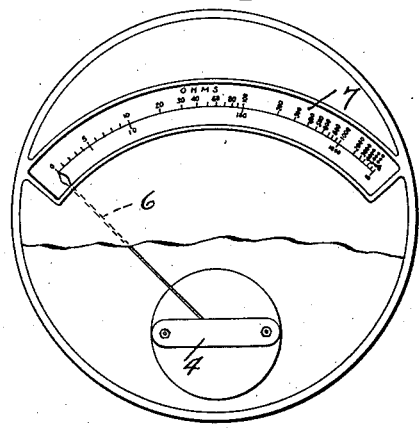
Fig. 1 is a plan view, partly broken away, of an electrical measuring instrument made in accordance with my invention.
Figure 2:
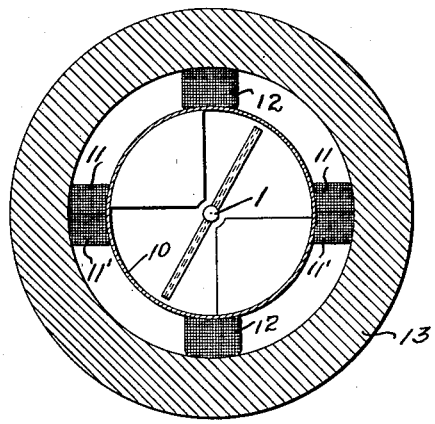
Figs. 2 and 3 are transverse and sectional views, respectively.
Figure 3:
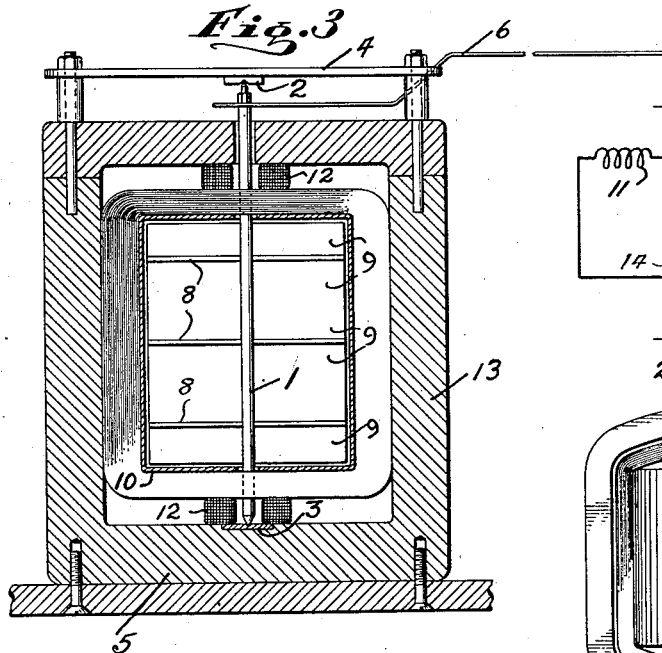

Referring to the drawings in detail, my improved instrument, as illustrated in Figs. 1 to 3, comprises a central shaft 1 pivotally mounted in jewels 2 and 3 in top plate 4 and bottom wall 5. This shaft carries a pointer or indicator 6 adjacent its upper end and cooperating with the scale 7. It will be noted that the indications on the scale 3 are logarithmic between points one tenth the value of the mid-point and ten times the value of the mid-point of the scale. With such indications it will be obvious that resistances within a range of 100 to 1 can be read with constant accuracy. It will also be noted that the scale ranges from zero to infinity hence the pointer 6 will never go off scale.

The moving system of my improved instrument comprises the shaft 1 which passes through and is secured to a plurality of superimposed thin permanent magnets 8 and aluminium foil damping vanes 9. These magnets and damping vanes along with the shaft 1 rotate inside a damping box 10. In the form illustrated this damping box supports fixed coils 11 and 11' and a fixed coil 12, although a separate damping box can be provided if desired.

Enclosing the coils 11, 11' and 12 and the damping box 10 I provide an outer iron core 13 which may be pure iron or other material having the characteristics of "Permalloy", good permeability and very low hysteresis and retentivity. The function of this core is to shield the moving magnets 8 from external fields and to raise the efficiency of the device by lowering the reluctance of the magnetic circuit. This core, however, as distinguished from the usual permanent horseshoe magnet, must not be permanently magnetized.

The end plates of the core may be made of the same material as the core itself.

In the embodiment of my invention being described, the coils 11 and 11' are of the same size wire, of the same number of turns and the coils are magnetically opposed. The plane of each of these coils is perpendicular to the plane of the coil 12. The coil 12 is of the same size wire as the coils 11 and 11', and the number of turns employed in this coil is equal to the sum of the turns employed in coils 11 and 11'.

Figure 4:
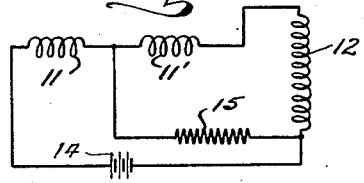
Fig. 4 is a wiring diagram.

From the wiring diagram as illustrated in Fig. 4 it will be seen that in use the coils of my instrument are connected to a source of direct current such as a battery, and that my instrument comprises two circuits, a series circuit including coil 11 and resistance 15, the value of which is to be determined and a shunt circuit including coils 11' and 12.

It will be obvious that when the value of 15=0, the current flowing in coils 11' and 12=0, while the current flowing in coil 11 is at a maximum. Accordingly, the movable magnets 8 and indicator 6 will assume a position perpendicular to the plane of the coil 11. When the value of 15 is infinite, (open circuit) the current flowing in coil 11 equals the current flowing in coils 11' and 12, the current flowing in the latter being at its maximum, and inasmuch as the coils 11 and 11' are magnetically opposed they will neutralize each other so that the movable magnets will assume a position in which the indicator 6 will be perpendicular to the plane of the coil 12.

Under the described conditions of coil construction and arrangement, it will be apparent that for any value of 15, other than those mentioned, the movable magnets and indicator will assume a corresponding position between the planes above mentioned.

Within limits determined by hysteresis, retentivity and permanent magnetism in the soft iron core 13, the position of this field is independent of its intensity and consequently of the operating voltage.

Figure 5:
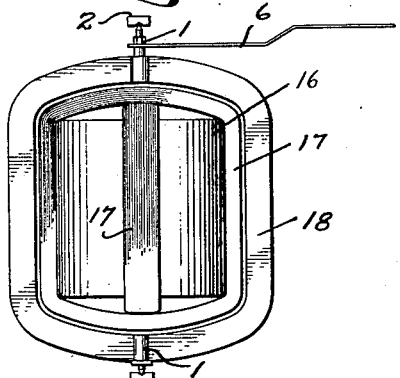
Fig. 5 is an elevational view of a modified embodiment of my invention.
Figure 6:
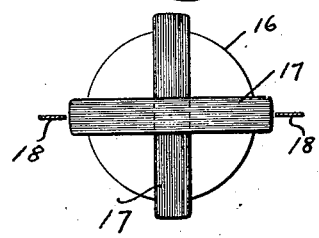
Fig. 6 is a plan view of the apparatus of Fig. 5.

Referring for a moment to the embodiment of my invention as illustrated in Figs. 5 and 6, it will be seen that in this construction the core 16 which corresponds to the core 13 of Figs. 2 and 3 has been made solid, and that the coils 17 are on the outside of this core, instead of on the inside, as in Figs. 2 and 3. Likewise the magnets 18 are on the outside of the core.

In the embodiment of my invention illustrated in Figs. 7 and 8 the moving system, the fixed coils and the core are substantially similar to corresponding parts shown in Figs. 2 and 3. The shaft 1' which corresponds with the shaft 1 of Figs. 2 and 3 is supported on a single pivot 19 to reduce friction and perfect the balance. In this form, if desired, I may employ fluid damping in conjunction with a float to relieve part of the load on the pivot, similar to the construction employed in marine compasses.

In this embodiment of my invention a flat mirror 20 is substituted for the pointer 6 and a scale 21 is provided which may be in the form of a ribbon bent into a semicircle concentric with the axis of the moving system. This strip may be of non-corrosive metal finely engraved with many divisions. An encased lamp 22 is provided to illuminate the scale. Light reflected from the scale 21 falls on the movable mirror 20 from which it is reflected to positive lens 23 which focuses it to form a reduced image of the scale beyond a convex spherical mirror 24. This mirror, having a short focal length, focuses an enlarged image of the illuminated portion of the scale upon a ground glass 25.

It has been pointed out above that in the embodiment of my invention illustrated in Figs. 2 and 3 that by reason of the construction and arrangement of the coils 11, 11' and 12 the deflection of the indicator 6 will be 90° from a position perpendicular to the plane of the coil 11 when the value of 15=0, to a position perpendicular to the plane of the coil 12 when the value of 15 is infinite.

It will be obvious, however, to those skilled in this art that the relative number of turns in the coils 11, 11' and 12 may be varied within wide limits and in fact may be designed to effect any desired deflection of the indicator depending upon the value of 15.

In the wiring diagram of Fig. 9 I have shown a modified circuit arrangement. It will be observed from this figure that but two coils are employed, designated A and B, respectively, instead of the three coils of Figs. 2 and 3. These coils have the same number of turns and the resistance C to be measured is connected across the coil A. This arrangement will produce a 45° deflection of the indicator from a position at right angles to plane of coil B' with zero resistance C to 45° removed from this position with infinite resistance C instead of the 90° deflection produced in the instrument of Figs. 2 and 3.

In the wiring diagram of Fig. 10 the resistance C' and coil B' are in series and connected across the coil A'. This arrangement produces a 45° deflection of the indicator from a position midway between the planes of the coils at zero resistance to a position at right angles to the plane of coil A' at infinite resistance, instead of the 90° deflection produced in the instrument of Figs. 2 and 3.

It is to be understood that in the arrangements of Figs. 9 and 10, the coils A and A' have the same number of turns as the coils B and B', respectively.

It will be quite apparent to those skilled in this art that other circuit arrangements may be employed in accordance with my invention without departing from the spirit and scope thereof.

In the diagram of Fig. 11 I have shown a still further modification of my invention so far as circuit and coil arrangement is concerned. It will be observed from this diagram that coil E and a coil F having half the number of turns of coil E are in series with resistance C across the battery 14, while coil G having the same number of turns as coil F is connected in shunt to this first circuit. This arrangement gives a maximum field when the value of C is a maximum and two thirds of this field when the value of C is zero.

It will be seen from all of the foregoing that my invention provides a current-ratio measuring instrument which is extremely simple in its construction, eliminates the necessity of springs for returning the indicator to zero position, and may be designed to give the indicator any range of movement desired. It is to be understood, furthermore, that other types of indicator may be employed if desired. As for example a graph indicator may be used for permanently recording current ratio values.

It will be appreciated that changes may be made in the details of construction and arrangement of parts herein illustrated and described within the purview of my invention.

What I claim is:—

1. An electrical measuring instrument comprising in combination a plurality of fixed coils disposed in different planes, a moving system comprising a rotatable shaft, magnets supported by said shaft in the fields of said coils and an indicator carried by said shaft adapted to be deflected by movement of said system under the influence of said fields, and an iron core cooperating with said coils, said core being magnetized only when said coils are energized.

2. An electrical measuring instrument comprising in combination a plurality of fixed coils disposed in different planes, a moving system comprising a rotatable shaft, magnets supported by said shaft in the fields of said coils and an indicator carried by said shaft adapted to be deflected by movement of said system under the influence of said fields, and an iron core cooperating with said coils and surrounding said magnets, said core being magnetized only when said coils are energized.

3. An electrical measuring instrument comprising in combination a plurality of fixed coils disposed in different planes, a moving system comprising a rotatable shaft, magnets carried thereby and influenced by the fields of said coils, damping vanes associated with said magnets and an indicator carried by said shaft adapted to be deflected by movement of said system under the influence of said fields, and an iron core cooperating with said coils and surrounding said magnets, said core being magnetized only when said coils are energized.

4. An electrical measuring instrument comprising in combination a plurality of fixed coils disposed in different planes, a moving system comprising a rotatable shaft, magnets carried thereby and influenced by the fields of said coils, damping vanes associated with said magnets and an indicator carried by said shaft adapted to be deflected by movement of said system under the influence of said fields, and an iron core cooperating with said coils, said core being magnetized only when said coils are energized.

5. An electrical measuring instrument comprising in combination a plurality of fixed coils disposed in planes perpendicular to each other, a plurality of magnets disposed in the fields of said coils, damping vanes associated with said magnets, a rotatable shaft supporting said magnets and damping vanes, an indicator carried by said shaft, and a closed cylindrical iron core surrounding said magnets and vanes.

6. An electrical measuring instrument comprising in combination a plurality of fixed coils disposed in planes perpendicular to each other, a plurality of magnets disposed in the fields of said coils, damping vanes associated with said magnets, a rotatable shaft supporting said magnets and damping vanes, an indicator carried by said shaft, and an iron core cooperating with said coils, said core being magnetized only when said coils are energized.

7. An electrical measuring instrument comprising in combination a damping box, a plurality of coils supported by said box in different planes, a rotatable shaft within said box, a magnet supported by said shaft and influenced by the fields of said coils, and an indicator carried by said shaft.

8. A device of the class described comprising in combination a fixed damping box, a plurality of coils supported on said box in different planes, a shaft rotatable within said box, magnets supported by said shaft and influenced by the fields of said coils, an indicator carried by said shaft, and a closed cylindrical fixed iron core surrounding said damping box.

9. In an electrical measuring instrument the combination of a plurality of superimposed magnets, a shaft carrying said magnets, a pointer on said shaft, a damping box surrounding said magnets, a plurality of coils connected to a source of electrical energy so as to be magnetically opposed, carried by said damping box, said coils lying in parallel planes, and another coil carried by said damping box, the plane of said last mentioned coil being perpendicular to the coils first mentioned.

10. In an electrical measuring instrument the combination of a plurality of coils connected to a source of electrical energy so as to be magnetically opposed, disposed in parallel planes, another coil disposed in a plane perpendicular to the planes of the first mentioned coils, a rotatable shaft, an indicator and a plurality of permanent magnets carried by said shaft, said magnets being positioned in the magnetic fields of said coils.

11. In an electrical measuring instrument the combination of a plurality of coils of the same number of turns but, said coils connected to a source of electrical energy so as to be magnetically opposed, being disposed in parallel planes, another coil disposed in a plane perpendicular to the planes of the coils first mentioned, a circuit including a source of direct current, one of said first mentioned coils and a resistance to be measured, a circuit in shunt to the said first mentioned circuit and including the other of said coils, and a moving system in the fields of said coils adapted to assume various positions in accordance with changes in the value of said resistance upon closure of said circuits.

12. In an electrical measuring instrument the combination of a plurality of coils connected to a source of electrical energy so as to be magnetically opposed, disposed in parallel planes, another coil disposed in a plane which is perpendicular to the planes of the first mentioned coils, a moving system comprising a rotatable shaft carrying a plurality of permanent magnets and a pointer or indicator, said magnets being positioned in the fields of said coils, a series circuit including a source of power, one of said first-mentioned coils and a resistance to be measured, a shunt circuit including the other mentioned coils, and a scale cooperating with said pointer or indicator and calibrated in accordance with the resistance of said shunt circuit, whereby a direct reading may be taken of the value of the resistance to be measured upon the closure of said circuits.

13. In an electrical measuring instrument, the combination of a plurality of coils connected to a source of electrical energy so as to be magnetically opposed in parallel planes, another coil disposed in a plane at right angles to the planes of the first mentioned coils, a movable system comprising a shaft, a plurality of permanent magnets and a pointer or indicator carried by said shaft, said magnets being disposed in the fields of said coils, and a core having good permeability and very low hysteresis and retentivity surrounding said coils and magnets.

14. In an electrical measuring instrument the combination of a plurality of fixed coils in planes disposed at an angle to each other, a source of direct current for energizing said coils, said coils being series connected, and a resistance the value of which is to be measured connected across one of said coils.

15. In an electrical measuring instrument the combination of a plurality of fixed coils in planes disposed perpendicular to each other, a source of direct current for energizing said coils, said coils being series connected, and a resistance the value of which is to be measured connected across one of said coils.

16. In an electrical measuring instrument the combination of a plurality of fixed coils in planes disposed at an angle to each other, a source of direct current energy for said coils, and a resistance to be measured, one of said coils being connected in series with said energy source, the other coil and said resistance being connected in series with each other and in shunt to the first mention coil.

17. In an electrical measuring instrument, the combination of a plurality of fixed coils, a source of direct current energy for said coils, a resistance to be measured, the plane of one of said coils being perpendicular to the plane of the other coils, two of said coils and said resistance being connected in series with said battery, the other coil being connected in shunt to said first mentioned circuit.

18. An electrical measuring instrument comprising in combination a solid core, coils surrounding said core disposed in planes perpendicular to each other, a movable magnet surrounding said core and influenced by the fields of said coil, and an indicator deflected by movement of said magnet.

19. In a current ratio indicator the combination of a closed cylindrical core of good permeability and low hysteresis and retentivity, a plurality of wire coils placed in two planes perpendicular to each other, a moving system in proximity to said coils comprising a magnet pivotally mounted so as to rotate under the influence of the electromagnetic field of said core and coils, means attached to said magnets for observing the rotation thereof, means for damping the movement of said moving system, and a calibrated scale to which the deflections of said moving system can be referred.

JOHN R. PATTEE.